(12) United States Patent
Couppee et al.

(10) Patent No.: US 9,796,365 B2
(45) Date of Patent: Oct. 24, 2017

(54) ELECTRONIC-PNEUMATIC BRAKING SYSTEM, FOR EXAMPLE FOR A HEAVY GOODS VEHICLE OR ARTICULATED TRUCK

(71) Applicant: WABCO GmbH, Hannover (DE)

(72) Inventors: Ulrich Couppee, Coppenbruegge (DE); Bernd-Joachim Kiel, Wunstorf (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/023,804

(22) PCT Filed: Jul. 31, 2014

(86) PCT No.: PCT/EP2014/002109
§ 371 (c)(1),
(2) Date: Mar. 22, 2016

(87) PCT Pub. No.: WO2015/043695
PCT Pub. Date: Apr. 2, 2015

(65) Prior Publication Data
US 2016/0214588 A1     Jul. 28, 2016

(30) Foreign Application Priority Data
Sep. 25, 2013   (DE) ........................ 10 2013 015 972

(51) Int. Cl.
*B60T 8/48*       (2006.01)
*B60T 8/36*       (2006.01)
*B60T 8/34*       (2006.01)

(52) U.S. Cl.
CPC ............ *B60T 8/4818* (2013.01); *B60T 8/342* (2013.01); *B60T 8/3675* (2013.01)

(58) Field of Classification Search
CPC ......... B60T 8/342; B60T 8/362; B60T 8/4818
(Continued)

(56) References Cited

U.S. PATENT DOCUMENTS 4,903,576 A     2/1990  Höfler et al.
5,466,053 A *  11/1995  Koelzer ................. B60T 15/22
                                                              303/7
(Continued)

FOREIGN PATENT DOCUMENTS

DE        10158065 A1     6/2003

OTHER PUBLICATIONS

Machine Translation of pp. 4 and 5 of Publication No. 815 020 194 3, Version 002/02.11, Entitled "Das Anti-Blockier-System (ABS) und die Antriebs-Schlupfregelung (ASR)"—"Antilock Braking Systems (ABS) and Traction Control Systems (TCT)", accessed on the Internet at http://inform.wabco-auto.com/intl/pdf/815/01/94/8150201943.pdf.

(Continued)

*Primary Examiner* — Thomas J Williams
(74) *Attorney, Agent, or Firm* — Brinks Gilson & Lione

(57) ABSTRACT

An electronic-pneumatic braking system for a vehicle, for example for a heavy goods vehicle or an articulated truck, includes a TCS/ESC modulator (1), enabling control functions for a traction control system (TCS) and a vehicle stability control system (ESC). The TCS/ESC modulator (1) includes a pneumatic relay valve (2), a solenoid valve (7) and a changeover valve device (11). In order to achieve a compact size and cost savings during manufacture, only control pressure can be applied to the solenoid valve (7) and to the changeover valve device (1), while only the pneumatic relay valve (2) has a large nominal size for conveying the supply pressure to at least one wheel brake and for venting the latter. As a result, the changeover valve device (11) can be structurally integrated in a TCS/ESC modulator (1) intended for carrying out the TCS/ESC functions.

5 Claims, 3 Drawing Sheets

(58) Field of Classification Search
USPC .............................................................. 303/3
See application file for complete search history.

(56) References Cited

U.S. PATENT DOCUMENTS

| | | | | |
|---|---|---|---|---|
| 5,718,486 | A * | 2/1998 | Vollmer | ................... B60T 8/00 |
| | | | | 303/15 |
| 8,864,245 | B2 * | 10/2014 | Schnittger | ............. B60T 13/662 |
| | | | | 137/625.25 |
| 2011/0147141 | A1 | 6/2011 | Schnittger et al. | |

OTHER PUBLICATIONS

European Patent Office, Rijswijk, Netherlands, International Search Report of International Application No. PCT/EP2014/002109, dated Dec. 3, 2014, 2 pages.

* cited by examiner

ELECTRONIC-PNEUMATIC BRAKING SYSTEM, FOR EXAMPLE FOR A HEAVY GOODS VEHICLE OR ARTICULATED TRUCK

TECHNICAL FIELD

The invention relates to an electronic-pneumatic braking system.

BACKGROUND

The action of a traction control system (TCS) and the action of an electronic stability control system (ESC) are described on pages 4 and 5, respectively, of company publication No. 815 020 194 3, version 002/02.11, "Das Anti-Blockier-System (ABS) and die Antriebs-Schlupfregelung (ASR)" ("Antilock braking systems (ABS) and traction control systems (TCS)") by the applicant.

The construction of an air braking system having an antilock braking system (ABS), a traction control system (TCS) and an electronic stability control system (ESC) are furthermore shown schematically, including the most important components, on page 16. From this illustration, it can be seen that two ABS solenoid control valves, a pneumatic two-way valve, a pneumatic relay valve and a 3/2-way solenoid valve are present at the front axle and the driven axle of a truck for said ABS, TCS and ESC functions. The 3/2-way solenoid valve, in particular, must have a nominal diameter which allows unhindered flow of the supply pressure coming from an air reservoir to the pneumatic two-way valve and, from there, to the pneumatic relay valve. This is required because individual wheels of the vehicle have to be braked and also released again very quickly in the case of a TCS/ESC braking operation, i.e. not in the case of a normal service braking operation, which is initiated and controlled by means of a truck braking valve 4. Said valves are designed as independent valve elements and, accordingly, require increased structural complexity, which is associated with increased costs.

Given this background situation, it is the underlying object of the invention to reduce large nominal diameters in one or more of the valves in the TCS/ESC modulator mentioned at the outset in order thereby to achieve a reduction in overall size and consequently achieve cost savings without impairing the TCS and ESC functions described.

SUMMARY

Accordingly, the invention starts from an electronic-pneumatic braking system for a vehicle, e.g. for a heavy goods vehicle or an articulated truck, comprising a TCS/ESC modulator, by means of which control functions for a traction control system (TCS) and a vehicle stability control system (ESC) can be carried out, wherein the TCS/ESC modulator comprises a pneumatic relay valve, a solenoid valve and a changeover valve device.

According to the invention, it is envisaged that the relay valve has a control chamber, which is connected to an outlet of the changeover valve device, a first port as a pneumatic inlet for a supply pressure from a pressure supply device, a second port as a pneumatic outlet leading to a wheel brake, and a third port as a venting outlet for the wheel brake, that the solenoid valve has a first port as a pneumatic inlet for the supply pressure from a pressure supply device, a second port as a pneumatic outlet for the supply pressure, and a third port as a pneumatic venting outlet, that the changeover valve device has a first port as a pneumatic inlet, to which a control pressure of a service brake of the electronic-pneumatic braking system can be applied, a second port as a pneumatic inlet, to which the supply pressure from a pressure supply device can be applied, and a third port as a pneumatic outlet, via which the control pressure for the formation of an electronically controlled pneumatic wheel brake pressure or the supply pressure is fed to the control chamber of the relay valve, that the changeover valve device can adopt two control positions, of which the first control position connects the first port of the changeover valve device, which is supplied with control pressure, to the third port of the changeover valve device, and of which the second control position connects the second port of the changeover valve device, which can be supplied with supply pressure via the solenoid valve, to the third port of the changeover valve device, that the solenoid valve is designed in such a way that it is switched from its rest position into its actuating position in order to perform a TCS/ESC function and thereby at least temporarily brings about the second control position of the changeover valve device, that, in the first control position of the changeover valve device, the pneumatic relay valve, which is supplied with the supply pressure, produces the pneumatic wheel brake pressure, which is electronically controlled or controlled by a foot brake valve and is proportional to the control pressure, and, in the second control position of the changeover valve device, allows the supply pressure through as wheel brake pressure, and that a first control chamber of the changeover valve device is connected to the second port of the changeover valve device, that a second control chamber of the changeover valve device is connected to the third port of the changeover valve device, and that a check valve, which in each case blocks flow to the second port of the changeover valve device, is arranged between the second port and the third port of the changeover valve device.

Accordingly, the solenoid valve is used exclusively for pneumatically controlling the changeover valve device and for acting upon the piston of the relay valve, this being associated with only a low consumption of compressed air and thus not requiring large nominal diameters in the solenoid valve. The solenoid valve can thus be designed with a reduced overall size as compared with known solenoid valves for TCS/ESC modulators and, as a result, can be manufactured at lower cost. Moreover, the changeover valve device is used only to control the control chamber of the pneumatic relay valve, which modulates the flow of supply pressure in proportion to the control pressure and, in the TCS/ESC function, allows the supply pressure through to the respective wheel brake or vents the respective wheel brake, with the result that correspondingly large nominal diameters are required only in the pneumatic relay valve. Accordingly, the changeover valve device can advantageously be combined structurally with a TCS/ESC modulator electronically controlled to control the TCS/ESC functions.

In terms of structure, the changeover valve device can be of relatively simple design if it has a cup-shaped valve changeover body, designed as a metal-reinforced or plastic-reinforced elastomer component, having a substantially flat bottom that has an embedded metal reinforcement or plastic reinforcement in the form of a disk and having a sealing lip, which forms a cylindrical side wall, wherein the sealing lip slidably and sealingly surrounds a sliding surface on a cylindrical extension on a cylindrical housing and delimits a pressure space that can be supplied with supply pressure via the second port, a bottom surface which faces away from the pressure space can be supplied with control pressure via the first port, and the third port opens into an annular space, which surrounds the valve changeover body and can be connected to the first port or the second port, depending on the position of the valve changeover body.

A similar changeover valve device is disclosed in DE 101 58 065 A1 by the applicant, but there it serves as a redundant pressure changeover valve and accordingly interacts with other components of an electronic-pneumatic braking system.

The invention is explained in greater detail below by means of an illustrative embodiment shown in the drawings.

DETAILED DESCRIPTION OF THE DRAWINGS

The drawings are provided herewith for purely illustrative purposes and are not intended to limit the scope of the present invention.

Figure 1:
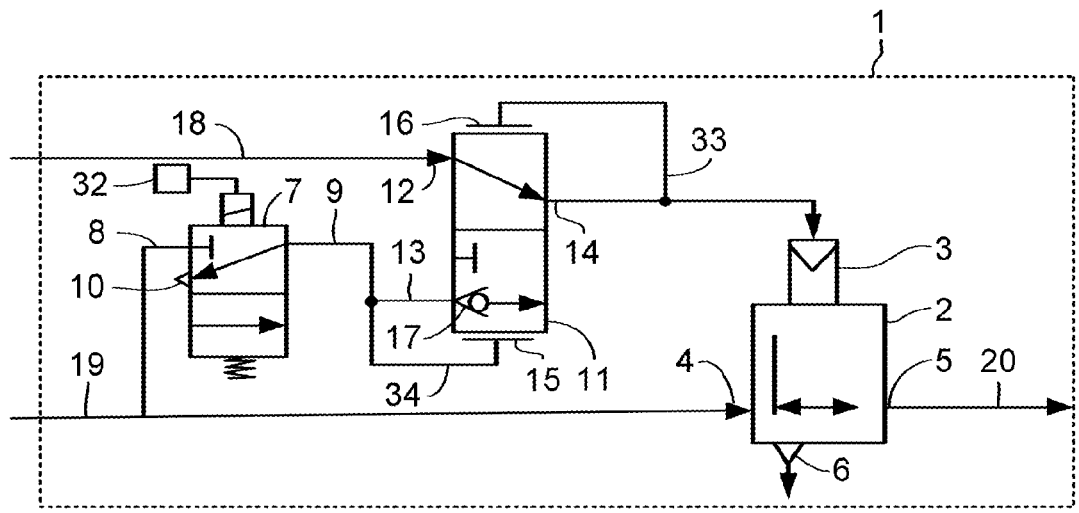
FIG. 1 shows a block diagram of a brake pressure modulator embodied in the form of a TCS/ESC modulator in the position for a normal service braking operation.
Figure 2:
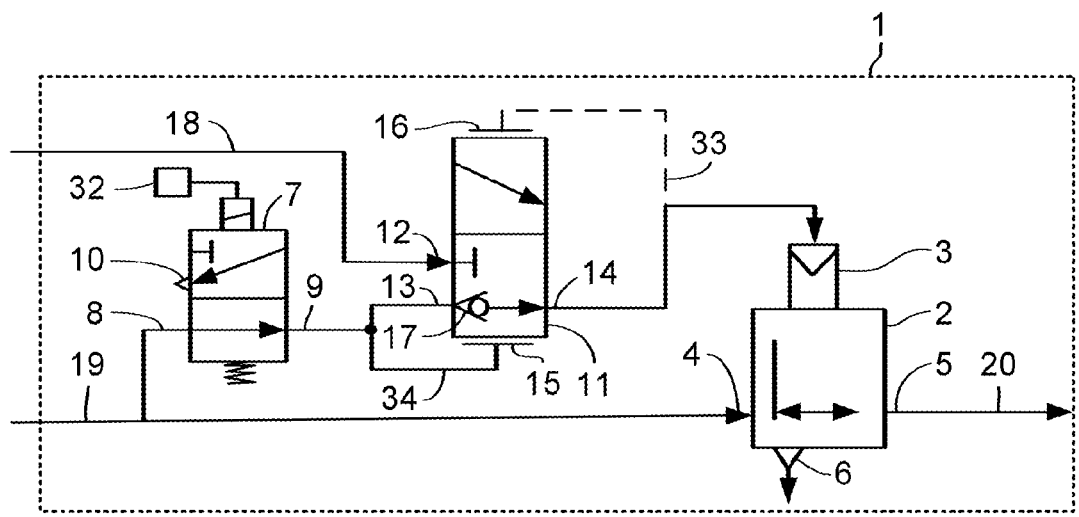
FIG. 2 shows the block diagram of the brake pressure modulator embodied in the form of a TCS/ESC modulator in the position for a TCS/ESC braking operation.

The block diagrams illustrated in FIGS. 1 and 2 showing a TCS/ESC modulator 1 are part of an electronic-pneumatic braking system (not shown specifically) of the kind that can be found, for example, in the company publication mentioned at the outset. The TCS/ESC modulator 1 comprises a pneumatic relay valve 2, which is generally used in electronic-pneumatic braking systems and has a first port 4 as an inlet for a supply pressure from a pressure supply device supplied via a supply pressure line 19, a second port 5 as an outlet for a wheel brake pressure line 20 leading to a wheel brake, and a third port 6, which is used as a venting outlet of an associated wheel brake and is fed via the wheel brake pressure line 20. By means of its control chamber 3, the pneumatic relay valve 2 can be actuated to allow the supply pressure through in modulated or in unmodulated form from the first port 4 to the second port 5 or, to vent the wheel brake pressure line 20, from the second port 5 to the third port 6. This actuation of the relay valve 2 is accomplished pneumatically by means of a solenoid valve 7 or by means of the pressure output by a foot brake valve and by means of a changeover valve 11.

The solenoid valve 7 is electrically controlled in a known manner by a control unit 32. It has a first port 8 as an inlet for the supply pressure and, accordingly, is connected to the supply pressure line 19 in the first control position of the solenoid valve 7, said position being shown in FIG. 1. A second port 9 of the solenoid valve 7 is used as an outlet for the supply pressure and is connected to a second port 13 of the changeover valve 11 and, via a line 34, to a first control chamber 15 of the changeover valve device 11, in the first control position shown in FIG. 1. In the first control position shown in FIG. 1, a first port 12 of the changeover valve device 11 is used as an inlet for a control pressure supplied by a vehicle brake valve (not shown) via a control pressure line 18, while a third port 14 of the changeover valve device 11 is used as an outlet for the control pressure or the supply pressure and leads to the control chamber 3 of the relay valve 2. The third port 14 of the changeover valve device 11 is also connected, via a line 33, to a second control chamber 16 of the changeover valve device 11.

In the control position, shown in FIG. 1, of the TCS/ESC modulator 1, which corresponds to a normal service braking operation, the solenoid valve 7 is unenergized, with the result that the first port 8 thereof is shut off and the first control chamber 15 of the changeover valve device 11 is vented via the second port 9 of the solenoid valve 7 and a vent port 10 of the solenoid valve 7. Since either the control pressure of the control pressure line 18 is applied between the control chamber 3 of the relay valve 2 and the third port 14 of the changeover valve device 11 via the first port 12 and the third port 14 of the changeover valve device 11 or, as shown in FIG. 2, the supply pressure in the supply pressure line 19 is applied in the control chamber 3 via port 8 and port 9 of the solenoid valve 7 and via port 13 and port 14 of the changeover valve device 11, and this pressure is also not dissipated in the position of the solenoid valve 7 shown in FIG. 1, the changeover valve device 11 is always in the position shown in FIG. 1 when the solenoid valve 7 is unenergized. Accordingly, the control chamber 3 of the pneumatic relay valve 2 can be supplied with the control pressure via the control pressure line 18 and the changeover valve device 11, wherein the relay valve 2 modulates, in a known manner, the supply pressure supplied via the supply pressure line 19 in proportion to the control pressure in the control chamber 3 and directs this pressure via the wheel brake pressure line 20 to one or more wheel brakes.

In carrying out a TCS/ESC function, the solenoid valve 7 is energized and, as a result, adopts the control position shown in FIG. 2, in which the supply pressure from the supply pressure line 19 passes to the second port 13 of the changeover valve device 11 via port 8 and port 9 of the solenoid valve 7. At the same time, the first control chamber 15 of the changeover valve device 11 is supplied with supply pressure from port 9 of the solenoid valve 7 via line 34, with the result that the changeover valve device 11 adopts the position shown in FIG. 2, in which the first port 12 thereof is shut off and there is a connection between the second port 13 and the third port 14 of the changeover valve device 11 via a check valve 17.

Thus, the supply pressure passes via the third port 14 of the changeover valve device 11 to the control chamber 3 of the pneumatic relay valve 2, whereby the connection between the first port 4 and the second port 5 of the pneumatic relay valve 2 is opened, with the result that the full supply pressure is supplied to one or more wheel brakes via the wheel brake pressure line 20. In the control position of the changeover valve device 11 shown in FIG. 2, the control pressure line 18 is shut off.

Although there is a line connection between the third port 14 and a second control chamber 16, situated opposite the first control chamber 15, of the changeover valve device 11 via line 33, with the result that the supply pressure also enters the second control chamber 16 of the changeover valve device 11 in the control position in FIG. 2, this does not cause the changeover valve device 11 to switch over if the effective areas in the first control chamber 15 and in the second control chamber 16 are of equal size or the effective area in the second control chamber 16 is larger than that in the first control chamber 15.

Since the supply pressure only ever acts briefly on one or more brakes during the carrying out of a TCS/ESC function, and the wheel brake pressure line 20 is then supposed to be immediately vented again, the solenoid valve 7 and the control pressure in the control pressure line 18 must be correspondingly controlled and modified by the control unit 32, with the result that one or more wheel brakes are alternately supplied with supply pressure and then vented. This is controlled in a known manner by the electronic control unit, mentioned in the initially cited company publication of the applicant, of the electronic-pneumatic braking system.

Figure 3:
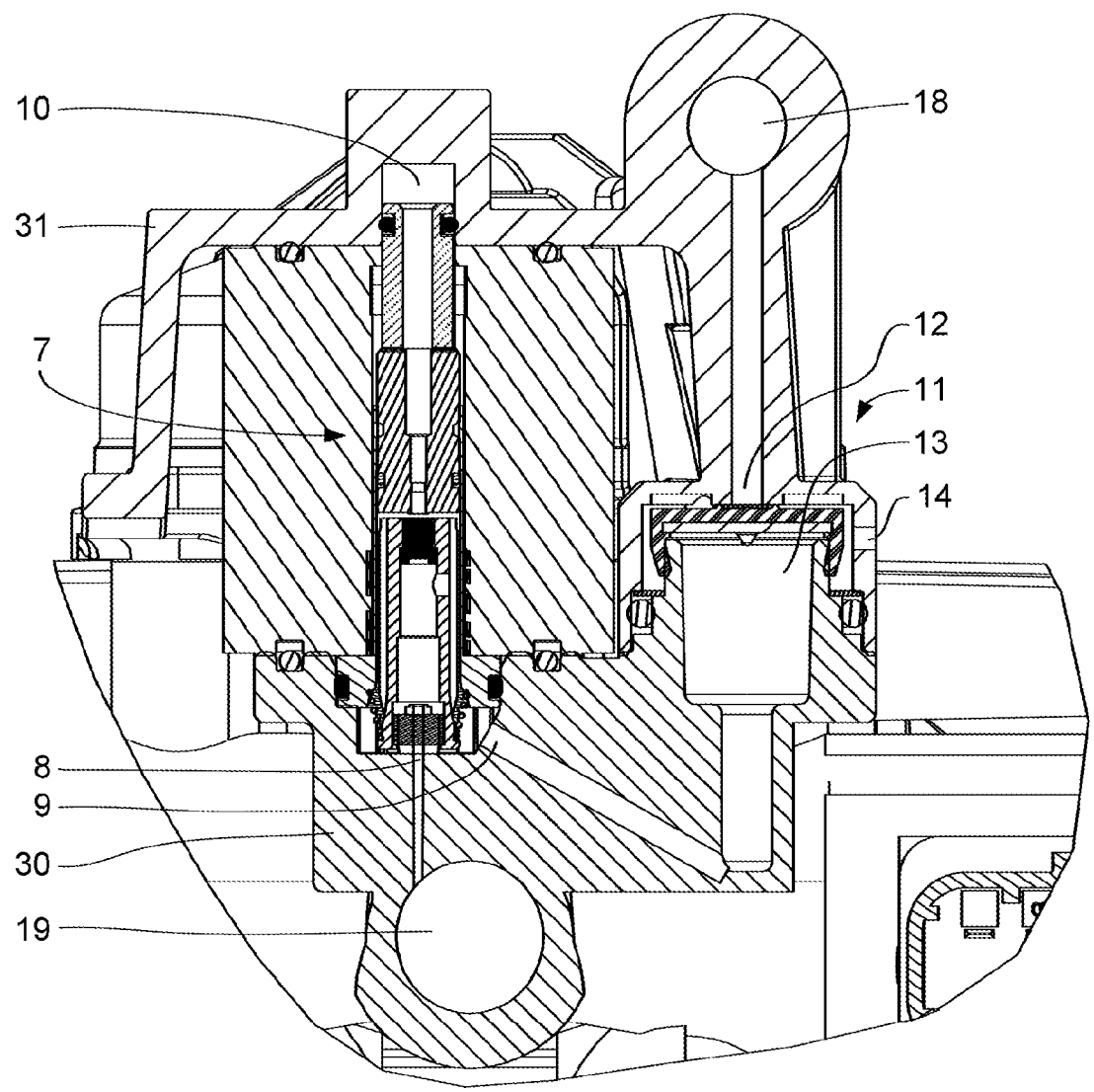
FIG. 3 shows a section through the changeover valve device combined structurally with the solenoid valve.

From FIGS. 1 and 2, it can be seen that only the pneumatic relay valve 2 is to have the full nominal diameter for the passage of the supply pressure, while the solenoid valve 7 and the changeover valve device 11 need only have nominal diameters for the applied control pressures. Consequently, the overall size of the solenoid valve 7 and the changeover valve 11 can be considerably reduced as compared with known technical solutions, and they can be combined into a single module. This is shown in FIG. 3.

In a housing (not fully shown), which consists of a housing bottom part 30 and a housing top part 31, the solenoid valve 7 and the changeover valve device 11 are combined to form a structural unit. The first port 8 of the solenoid valve 7 is connected to the supply pressure line 19, the second port 9 of the solenoid valve 7 is connected to the second port 13 of the changeover valve device 11, and the third port 10 of the solenoid valve 7 is a venting outlet. The first port 12 of the changeover valve device 11 is connected to the control pressure line 18, and the third port 14 is connected in a manner not shown to the control chamber 3 of the pneumatic relay valve 2.

Figure 4:
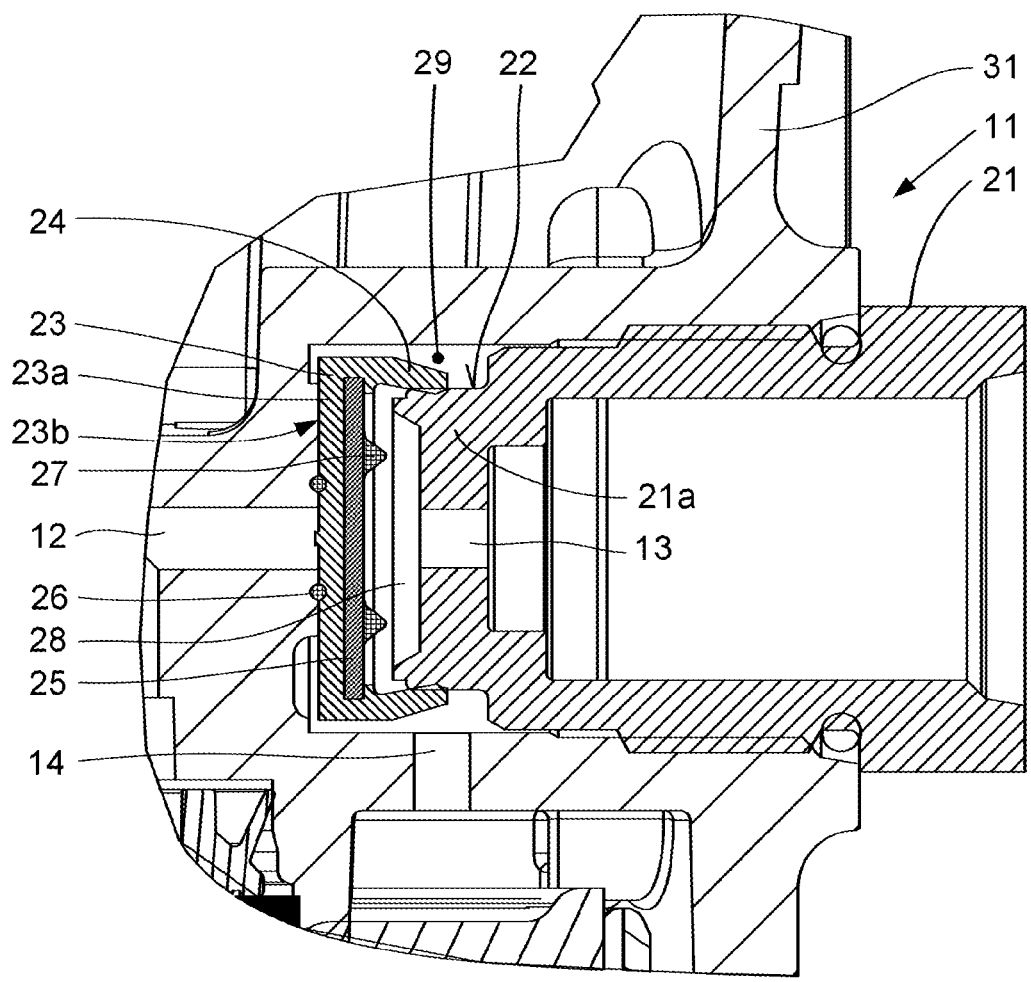
FIG. 4 shows an enlarged section through the changeover valve device in a different illustrative embodiment.

According to FIG. 4, the changeover valve device 11 comprises a cylindrical housing 21, which is screwed into the housing top part 31. An annular space 29, in which a valve changeover body 23 configured as a cup-shaped component element is arranged in an axially movable manner, is formed between the first port 12 of the changeover valve device 11 in the housing top part 31 and a cylindrical extension 21*a* of the cylindrical housing 21. The valve changeover body 23 comprises a bottom 23*a* having a bottom surface 23*b* and a hollow-cylindrical lateral wall in the form of an encircling flexible sealing lip 24, which sealingly surrounds the cylindrical extension 21*a* on the cylindrical housing 21. In this illustrative embodiment, a metal reinforcement 25 in the form of a metal disk is molded into the bottom 23*a* of the valve changeover body 23.

Sealing with respect to the first port 12 is accomplished by a sealing lip 26 running around in the form of a circle, which is molded onto the bottom surface 23*b* of the valve changeover body 23, while a plurality of axially aligned spacing elements 27, which ensure that the second port 13 cannot be closed by the bottom 23*a*, is arranged on the axially opposite side of the bottom surface 23*b*.

In the illustrated position of the valve changeover body 23, the first port 12 of the changeover valve device 11 is closed. If the second port 13 of the changeover valve device 11 is supplied with supply pressure as shown in FIG. 2, this supply pressure causes radial expansion of the encircling sealing lip 24, and the supply pressure passes initially into the annular space 29 and, from there, through the third port 14 of the changeover valve device 11, to the control chamber 3 of the pneumatic relay valve 2.

If, conversely, the first port 12 of the changeover valve device 11 is supplied with control pressure, the valve changeover body 23 is moved axially toward the second port 13 of the changeover valve device 11, and control pressure passes via the first port 12 of the changeover valve device 11 into the annular space 29 and, from there, through the third port 14 of the changeover valve device 11, to the control chamber 3 of the pneumatic relay valve 2, as shown in the illustration in FIG. 1.

Thus, the pressure space 28 between the valve changeover body 23 and the cylindrical extension 21*a* corresponds to the first control chamber 15 of the changeover valve device 11, and the bottom surface 23*b* of the valve changeover body 23 corresponds to the second control chamber 16 of the changeover valve device 11. From this, it follows that, when pressure in the pressure space 28 is relieved, the residual pressure prevailing in the annular space 29 brings about a movement of the valve changeover body 23 in the direction of the second port 13 of the changeover valve device 11 and frees the connection between the first port 12 and the third port 14 of the changeover valve device 11. From this, it follows that the position of the changeover valve device 11 illustrated in FIG. 1 is always adopted when the solenoid valve 7 is unenergized without the need for control pressure to be applied to the first port 12 of the changeover valve device 11 via the control pressure line 18.

The encircling sealing lip 24 resting sealingly on a sliding surface 22 of the cylindrical extension 21*a* acts as the check valve 17 illustrated in FIGS. 1 and 2 since, although it allows the supply pressure to pass from the second port 13 to the third port 14 of the changeover valve device 11 by appropriate radial expansion, it prevents return flow from the third port 14 to port 13 of the changeover valve device 11, said port not being subject to excess pressure, while maintaining a pressure in the annular space 29.

The changeover valve device 11 is thus a bistable switching element which, when the solenoid valve 7 shown in FIG. 2 is energized, adopts and retains the position shown in FIG. 4 and, in the unenergized situation of the solenoid valve 7 shown in FIG. 1, adopts a control position in which the valve changeover body 23 is moved axially in the direction of the second port 13 of the changeover valve device 11 and frees the connection from the first port 12 to the third port 14 via the annular space 29.

All the features mentioned in the above description of the Figures, in the claims and in the introduction to the description can be employed either individually or in any desired combination with one another. Thus, the invention is not restricted to the combinations of features described and claimed; on the contrary, all combinations of features are to be regarded as disclosed.

The invention claimed is:

1. An electronic-pneumatic braking system for a vehicle, comprising a TCS/ESC modulator (1) performing control functions for a traction control system (TCS) and a vehicle stability control system (ESC) the TCS/ESC modulator (1) including a pneumatic relay valve (2), a solenoid valve (7) and a changeover valve device (11), wherein the relay valve (2) has a control chamber (3) connected to an outlet (14) of the changeover valve device (11), a first port (4) as a pneumatic inlet for a supply pressure from a pressure supply device, a second port (5) as a pneumatic outlet leading to a wheel brake, and a third port (6) as a venting outlet for the wheel brake, wherein the solenoid valve (7) has a first port (8) as a pneumatic inlet for the supply pressure from the pressure supply device, a second port (9) as a pneumatic outlet for the supply pressure, and a third port (10) as a pneumatic venting outlet, wherein the changeover valve device (11) has a first port (12) as a pneumatic inlet, to which a control pressure of a service brake of the electronic-pneumatic braking system can be applied, a second port (13) as a pneumatic inlet, to which the supply pressure from the pressure supply device can be applied, and a third port (14) as a pneumatic outlet, via which the control pressure for the formation of an electronically controlled pneumatic wheel brake pressure or the supply pressure is fed to the control chamber (3) of the relay valve (2), wherein the changeover valve device (11) has two control positions, of which a first control position connects the first port (12) of the changeover valve device (11), which is supplied with control pressure, to the third port (14) of the changeover valve device (11), and of which a second control position connects the second port (13) of the changeover valve device (11) to the third port (14) of the changeover valve (11), wherein the solenoid valve is configured to supply the supply pressure to the third port (14) of the changeover valve device (11), wherein the solenoid valve (7) is configured to be switched from a rest position into an actuating position for performing a TCS/ESC function and to set the changeover valve device (11), at least temporarily, to the second control position, wherein, in the first control position of the changeover valve device (11), the pneumatic relay valve (2), which is supplied with the supply pressure, produces the pneumatic wheel brake pressure, which is proportional to the control pressure, and, in the second control position of the changeover valve device (11), allows the supply pressure through as wheel brake pressure, and wherein a first control chamber (15) of the changeover valve device (11) is connected to the second port (13) of the changeover valve device (11), a second control chamber (16) of the changeover valve device (11) is connected to the third port (14) of the changeover valve device (11), and a check valve (17) blocking a flow to the second port (13) of the changeover valve device (11) is arranged between the second port (13) and the third port (14) of the changeover valve device (11).

2. The braking system as claimed in claim 1, wherein the changeover valve device (11) is combined structurally with the TCS/ESC modulator (1).

3. The braking system as claimed in claim 2,
wherein the changeover valve device (11) has a valve changeover body (23), formed as a metal-reinforced elastomer component, having a substantially flat bottom (23a) that has an embedded metal reinforcement (25) in the form of a metal disk and having a sealing lip (24), which forms a cylindrical side wall, wherein the sealing lip (24) slidably and sealingly surrounds a sliding surface (22) on a cylindrical extension (21a) on a cylindrical housing (21) and delimits a pressure space (28) configured to be supplied with the supply pressure via the second port (13) of the changeover valve device, wherein a bottom surface (23b) of the valve changeover body (23) which faces away from the pressure space (28) is configured to be supplied with control pressure via the first port (12) of the changeover valve device, and wherein the third port (14) of the changeover valve device opens into an annular space (29), which surrounds the valve changeover body (23) and can be connected to the first port (12) of the changeover valve device or the second port (13) of the changeover valve device, depending on the position of the valve changeover body (23).

4. The braking system as claimed in claim 2,
wherein the changeover valve device (11) has a valve changeover body (23), formed as a plastic-reinforced elastomer component, having a substantially flat bottom (23a) that has an embedded plastic reinforcement (25) in the form of a disk and having a sealing lip (24), which forms a cylindrical side wall, wherein the sealing lip (24) slidably and sealingly surrounds a sliding surface (22) on a cylindrical extension (21a) on a cylindrical housing (21) and delimits a pressure space (28) that can be supplied with supply pressure via the second port (13), wherein a bottom surface (23b) of the valve changeover body (23) which faces away from the pressure space (28) can be supplied with control pressure via the first port (12) of the changeover valve device, and in that the third port (14) of the changeover valve device opens into an annular space (29), which surrounds the valve changeover body (23) and can be connected to the first port (12) of the changeover valve device or the second port (13) of the changeover valve device, depending on the position of the valve changeover body (23).

5. The braking system as claimed in claim 1, wherein the braking pressure is controlled by one of an electronic controller (32) or a foot brake valve.

* * * * *